Oct. 9, 1934.  G. W. BINNS  1,976,113
MACHINE TOOL
Filed July 29, 1932   3 Sheets-Sheet 1

Inventor
GEORGE W. BINNS
By HK Parsons
Attorney

Oct. 9, 1934.    G. W. BINNS    1,976,113
MACHINE TOOL
Filed July 29, 1932    3 Sheets-Sheet 2

Inventor
GEORGE W. BINNS
By A. K. Parsons
Attorney

Oct. 9, 1934.  G. W. BINNS  1,976,113
MACHINE TOOL
Filed July 29, 1932  3 Sheets-Sheet 3

Inventor
GEORGE W. BINNS
By AHParsons
Attorney

Patented Oct. 9, 1934

1,976,113

UNITED STATES PATENT OFFICE

1,976,113

MACHINE TOOL

George W. Binns, Cincinnati, Ohio, assignor to Cincinnati Grinders Incorporated, Cincinnati, Ohio, a corporation of Ohio Application July 29, 1932, Serial No. 625,919

20 Claims. (Cl. 29—33)

This invention relates to improvements in machine tools and especially to improvements in cutting off and forming machines.

An object of this invention is the provision of a new and improved cut off and forming machine for the manufacture from bar stock of cylindrical articles such as rollers, pins and like parts.

Another object of this invention is the provision of a machine of the above nature that is automatic in its action for the continuous production of articles as above specified.

A further and specific object of the invention is the provision of a machine for producing in an efficient and economical manner the small, so called, pin rollers utilized in pin roller bearings which are cut from bar stock and have their ends formed to a semi-globular or other configuration.

Other objects and advantages of the present invention should be readily apparent by reference to the following specification considered in conjunction with the accompanying drawings, forming a part thereof, and it is to be understood that any modifications may be made in the exact structural details there shown and described within the scope of the appended claims, without departing from or exceeding the spirit of the invention.

In the drawings:

Figure 1 is a front elevation of a machine embodying the improvements of this invention.

Figure 2 is a top plan view of the machine shown in Figure 1.

Throughout the several views of the drawings similar reference characters are employed to denote the same or similar parts.

The machine illustrated in Figures 1 to 7, inclusive, is adapted to be automatically operated and to produce the articles direct from the bar stock which is carried by a reel. As shown in these views, the machine comprises a bed 15 having formed on its upper surface ways 16 and 17 respectively supporting and guiding the work moving slide 18 and the tool carrying slide 19.

Figure 3:
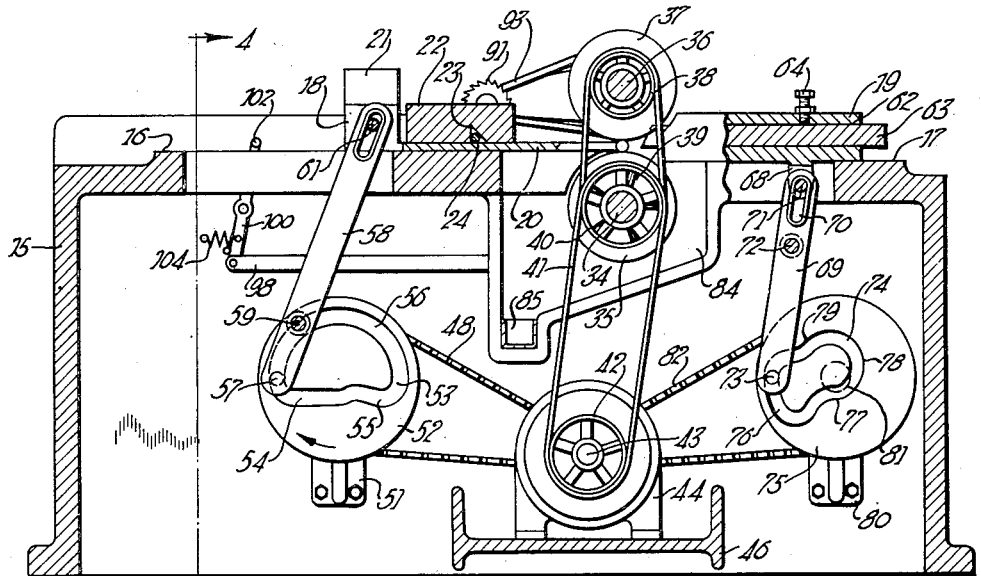
Figure 3 is a longitudinal sectional view through the machine, as seen from line 3—3 on Figure 2.

The work moving slide or head 18 is substantially L-shaped in longitudinal cross section, as seen in Figure 3, and comprises a pusher blade 20 extending from a head or upright portion 21. The blade 20 is adapted to pass through a way formed between the surface 16 and a block 22 that extends transversely of the machine. The block 22 is provided with a channel 23 through which the bar stock 24 is passed. The bar stock 24, see Figure 2, is coiled about a reel 25 rotatably mounted on an extension 26 of the bed 15. Carried by the extension 26 is an electric motor 27 having a friction feed drum or feed wheel 28 secured to its shaft and adapted to frictionally contact with the bar stock 24 and feed same from the reel 25 through the channel 23. In order to guide the bar stock to the friction feed wheel 28, the bed extension 26 carries a ferrule or guide 29 through which the work passes. The friction feed wheel 28 is adapted to feed the bar stock 24 from the reel 25 through the channel 23. The feed of the bar stock is limited by engagement of the free end with a switch member 30 associated with a switch 31 carried by the machine at the forward end of the channel 23. The switch 31 in addition to acting as an end stop for the bar 24 is electrically connected with the motor 27 for shutting off the current from said motor and thereby stopping further feed of the bar stock. Upon dropping of the bar from the channel 23 into the path of movement of the slide or blade 20, the spring, associated with the switch and compressed by the bar to close said switch, expands and again completes the electrical circuit for starting the motor 27 and feeding the raw material from the reel into the channel.

Figure 5:
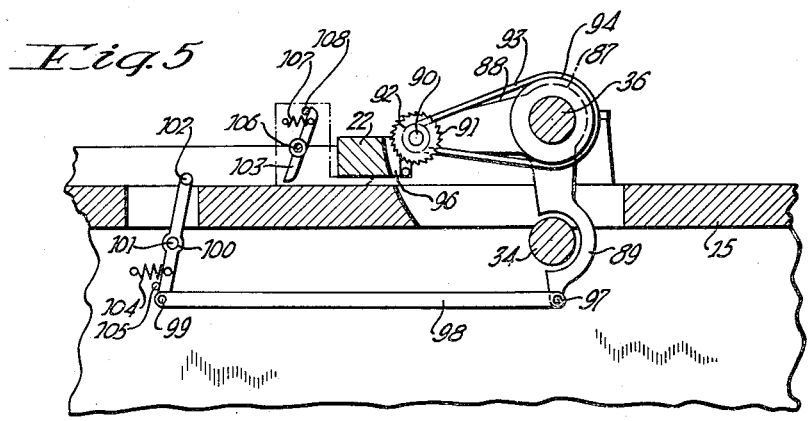
Figure 5 is a fragmentary sectional view taken on line 5—5 on Figure 2.

In order to cut the bar stock to the desired length from which the pin rollers are formed, the shaft 36, mounted on the bed, has loosely journaled on its rear end a bell crank 87 comprising an arm 88 which extends substantially parallel with the bed and a vertically disposed arm 89. The arm 88 has journaled in its free end a shaft 90 to which is secured a saw or cutter 91 and a pulley 92. Extending about the pulley 92 is a belt 93 which is also trained about a pulley 94 secured to the shaft 36 for actuation thereby. The saw 91 normally lies just above the work 24, as shown in Figure 5, so as not to interfere with the work as it passes through the channel 23 into the machine. The connecting bar or block 22, in which is formed the channel 23 for the bar stock, is provided with a vertical slot 96 through which the saw 91 passes as it is oscillated into engagement with the bar stock for cutting off a length thereof. The saw is brought into and out of engagement by oscillation of the bell crank 87 which will not be described.

The arm 89 of the bell crank 87 has pivoted to its lower end at 97 one end of a link 98 pivoted at its other end at 99 to the lower end of a lever 100 which is pivoted at 101 intermediate its ends. The upper end of the lever 100 has a pin 102, see Figure 4, projecting outwardly therefrom and adapted to be engaged by a pivotally mounted trip 103 carried by the adjacent side of the work slide head 21. The lever 100 has secured to it one end of a spring 104, the other end of which is anchored to a fixed part of the machine and normally oscillates the lever in a clockwise direction for correspondingly oscillating the bell crank 87 and holding the saw or cutter 91 above the work. This oscillation and positioning of the parts is determined by a stop pin 105 normally engaging with the lever and limiting the movement thereof by the spring 104. The latch 103 is so designed as to bring the saw or cutter 91 into operation at the proper time whereupon it is released so that the cutter may be returned to its normal inoperative position and the next piece or section of the bar stock fed into and through the passage 23. Accordingly, the latch 103 is pivoted intermediate its ends at 106 to the head 21 and has secured thereto one end of a spring 107, the other end of which is anchored to the head 21 for oscillating the trip in a counter-clockwise direction into engagement with a stop pin 108 projecting from the head 21. By this construction the retraction of the slide 20 and head 21 carried thereby causes the lower end of the trip to engage the pin 102 of the lever 100 and feed the saw or cutter into the bar stock to sever a desired length. Continued movement of the slide 20 soon causes the trip 103 to pass over the upper end of the lever 100 whereupon the spring 104 returns the saw to its inoperative position. Upon forward movement of the slide 20 the trip 103 engages on its rear surface with the pin 102 and thereby expands the spring 107 until the said trip has passed over the pin when it is returned to its normal position by the spring 107.

The bed 15 has secured thereto or formed integral therewith two pairs of journal bearings 32 and 33 which are positioned one above the other. Mounted in the journal bearings 32 is a shaft 34 having secured thereto a plurality of rolls 35 each of a length substantially equal to the length of the article being manufactured such as the pin rollers. The bearings 35 likewise have journaled therein a shaft 36 to which is secured a plurality of rollers 37 each of a length substantially equal to its opposed roller 35. The rollers 35 and 37 are spaced axially of their shafts to provide clearance between them for the cut off and forming tools later to be described.

The peripheries of the rolls 35 and 37 are spaced from one another a distance to provide work receiving and rotating throat of a size substantially equal to the diameter of the bar stock which is inserted therein by the work actuating blade 20. The rolls 35 and 37 are rotated at different speeds to thereby properly rotate the bar stock and at the same time hold the said bar stock against the pushing edge of the blade 20 during the actual cutting off and forming of the pin rollers. In order to properly rotate the said rolls, the shafts 34 and 36 have respectively secured to their one end a pulley 38 and 39, the former being of a slightly smaller diameter than the latter, whereby the rolls are rotated at slightly different speeds for exerting a lateral thrust on the bar stock and holding same against the edge of the pusher blade. The shaft 34 also carries a pulley 40 about which is trained a belt 41 which in turn extends about a pulley or sheave 42 secured to the motor shaft 43 of a prime mover 44 for thereby effecting the rotation of the said rolls 35 and 37. The prime mover 44 is shown as being carried by a shelf or bracket 45 interiorly of the bed 14 to which access may be had through the door 46.

To feed the work piece into the work receiving throat, the motor shaft 43 is projected beyond the rear of the motor 44 to which projecting portion of the shaft is secured a sprocket 47 having trained thereabout a chain 48 which is in turn trained about a larger sprocket 49 secured to a shaft 50 journaled in a bracket 51 secured to the inside of the rear wall of the bed 15. Also secured to the shaft 50 is a face cam 52 having a cam track 53 formed therein. The cam 52 is adapted to be rotated in a clockwise direction, as shown by the arrow thereon in Figure 3. It will be noted that the cam track 53 has a portion 54 which will effect a rapid retraction of the work slide 20, through mechanism to be later described, the horizontal portion 54 of the cam being followed by an angularly disposed portion 55 which will effect a rapid infeed of the said slide. Connecting the portion 54 of the cam track with the angularly disposed portion 55 is a concentric portion 56 which holds the work slide to its innermost position during the cutting off and forming of the pin rollers.

Figure 4:
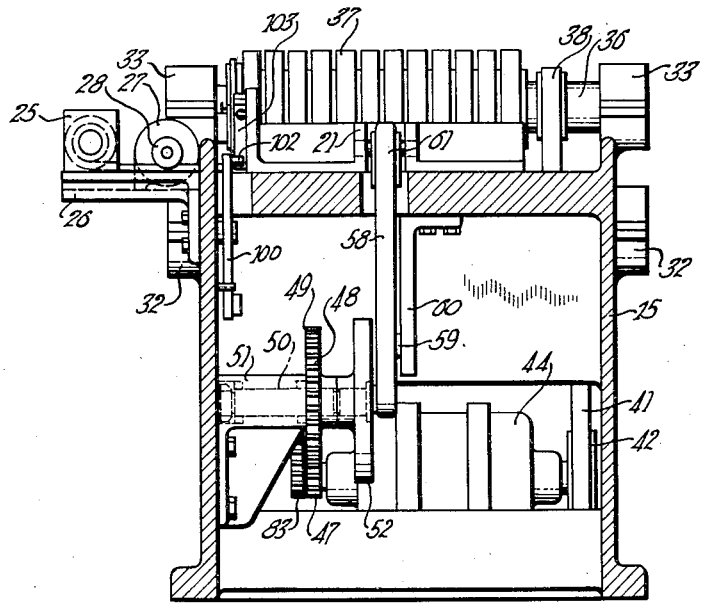
Figure 4 is a transverse sectional view through the machine, as seen from line 4—4 of Figure 3.

Received in the cam track 53 is an antifriction roller 57 carried by the lower end of an arm 58 pivoted at 59 to a bracket 60 depending interiorly of the bed 15, see Figure 4. The upper end of the arm 58 has a pin and slot connection 61 with the head 21 of the work slide 20 whereby oscillation of the arm 58 by the cam track 53 about the axis of the pivot 59 effects back and forth reciprocations of the work actuating slide. As shown in Figure 3, the bar stock 24 when within the channel 23 lies on the upper surface of the work actuating blade 20 so that upon retraction of the blade it will drop onto the guideway 16 ahead of the slide pusher nose. Upon movement of the work slide or blade toward the work receiving throat the bar stock is pushed into the work receiving and rotating throat.

The tool carriage slide 19 is provided with a series of tool pockets 62 each receiving a cut off and forming tool 63 held in place by means of a clamp bolt 64. The inner end or nose of each of the cut off tools terminates in an edge or point 65 having arcuate forming sides 66 and 67 extending therefrom. During the severing of the bar stock into individual work pieces and while the bar is being rotated, the forming sides 66 and 67 of the tool are in contact with the terminals of the work for rolling said terminals to the desired configuration. The slide 19 has depending interiorly of the bed 15 lugs or ears 68 receiving the upper end of an arm 69. The said upper end of the arm 69 is provided with a slot 70 through which passes a pivot pin 71 carried by the lugs 68. The arm 69 is pivoted intermediate its ends at 72 to a bracket carried by the bed, which bracket is similar to the bracket 60. The other end of the arm 69 rotatably supports an antifriction roller 73 received in a cam track 74 formed in the face of cam 75. The cam track 74 has a concentric portion 76 adapted to hold the slide 19 in its retracted position, shown in Figure 3, during the advancing movement of the work slide 18. Adjacent the concentric portion 76 is a rapid infeed portion 77 for carrying the cutters into contact with the bar stock and slowly feeding the cutters during the acual cutting off and initial forming thereof. Adjacent the portion 77 the cam track is provided with a concentric portion 78 which holds the tools in contact with the work pieces during the final forming of the ends thereof and is followed by the portion 79 which rapidly retracts the tools from the work to the position shown in Figure 3. The cam 75 is secured to the end of a shaft, similar to the shaft 50, which is rotatably mounted in a bracket 80 similar to the bracket 51. A sprocket similar to the sprocket 49 is mounted on the cam shaft 81 and has trained thereabout a sprocket chain 82 which is in turn trained about a sprocket 83 on the shaft 43 of the prime mover or motor 44.

From the foregoing it will be noted that the cams 53 and 75 are rotated in timed relation for synchronously actuating the work slide 18 and cutter slide 19. It will also be noted that so long as the main prime mover or motor 44 is running the slides are constantly operating for continuously producing pin rollers or other objects until the supply of raw bar stock is exhausted.

After the bar stock is cut and formed into the pin rollers, they are permitted to escape from the forming throat or are ejected therefrom by the succeeding work piece and are received in the pocket 84 formed integral with the bed 10 and delivered to a suitable receptacle 85 placed for their reception. The receptacle 85 is removable through a suitable opening 86 formed in the forward face of the bed 15.

From the foregoing it will be noted that there has been provided a machine for producing pin rolls and like articles from the rough or bar stock that is taken directly from a reel or other raw stock supporting and feeding mechanisms. It will further be noted that the machine is completely automatic in that the bar stock is first cut to length from the reel or other raw material supply, automatically fed into position to be severed into work pieces, the ends of the individual work pieces properly formed, and the machine parts returned to their starting position for the initiation of a new cycle.

Figure 8:
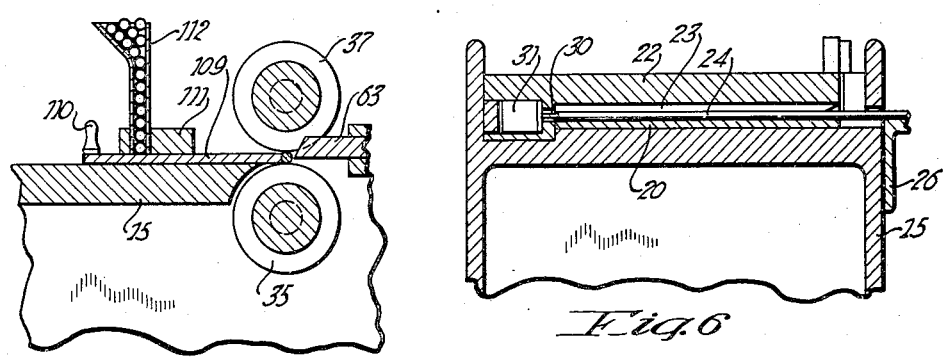
Figure 8 is a fragmentary sectional view illustrating a modified structure showing a hand operated machine instead of an automatic machine.
Figure 8:
Figure 6:
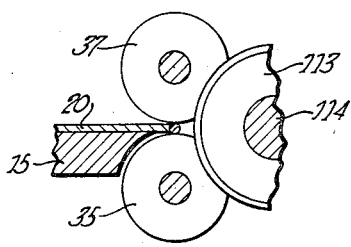
Figure 6 is a fragmentary sectional view taken on line 6—6 of Figure 2.
Figure 6:
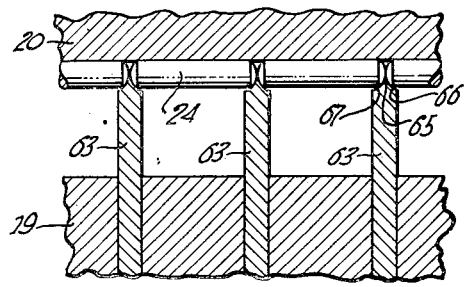

The mechanism disclosed in Figure 8 contemplates a manually operated machine instead of an automatic one. As there shown, the bed supports a manually actuable slide 109 having at one end thereof the handle 110. Carried by the bed above the slide 109 is a tie bar 111 to which is secured a hopper-magazine 112 which is adapted to receive the bar stock after it has been cut to the desired length from which the pin rollers or the like are to be severed. The hopper-magazine 112 guides the work pieces to the lower end thereof so that upon retraction of the slide 109 the lowermost bar falls in front of the slide for movement into position between the rolls upon forward actuation thereof.

Figure 9:
Figure 9 is a fragmentary view of a further modification utilizing rotatable cutters instead of axially movable cutters.
Figure 10:
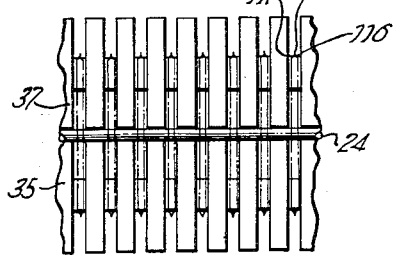
Figure 10 is a fragmentary elevational view of certain of the parts shown in Figure 9.
Figure 7:
Figure 7 is an enlarged fragmentary sectional view illustrating the contour of the cut off tools, which simultaneously form the ends of the work pieces.

In the modification shown in Figures 9 and 10, a different form of cutter and forming tool is utilized. In this construction rotary or circular cut off members 113 are provided instead of the elongated cutters 63 illustrated in Figure 3. The cutters 113 are spaced along a shaft 114 to which they are secured and operate within the spaces provided between adjacent rolls 35 and 37. The cutters 113 and shaft 114 are adapted to be carried by the slide 19 for movement therewith into the bar stock after it is positioned between the rolls 35 and 37. The periphery of the cutters 113 is formed in the same manner that the cutters 63 are formed, namely with a comparatively sharp cutting edge 114 being flanked on each side with forming portions 116 and 117 whereby the adjacent ends of the pin rollers or other articles are simultaneously rolled into semi-globular form.

It is to be understood that instead of moving the cutters into the bar stock while it is rotated, the work could be fed directly against stationary or rotating cutters without sacrificing the advantages of this invention.

What is claimed is:

1. In a machine tool of the class described the combination of a bed having formed thereon a pair of opposed slideways, a pair of rotating rolls disposed one above the other intermediate the slideways for receiving a piece of bar stock between them and for thereby rotating said bar stock, means supported by one of the slideways and shiftable relative thereto for inserting the bar stock between the rolls, and means supported by the other slideway and shiftable relative thereto for cutting and forming work pieces from the bar stock.

2. In a machine tool of the class described the combination of a bed having formed thereon a pair of opposed slideways, a pair of rotating rolls disposed one above the other intermediate the slideways for rotating a work piece, means supported by one of the slideways for disposing a work piece between the rolls, means supported by the other slideway for cutting and forming the work piece, a reel for raw stock carried by the bed to have bars cut therefrom and means for severing the bar stock from the reel prior to its insertion between the rolls.

3. In a cut-off and forming machine the combination of a bed, means for automatically positioning a section of bar stock on the bed, a work transfer and pusher slide for shifting the bar stock relative to the bed, a pair of superimposed rolls receiving the bar stock between them for effecting and controlling its rotation, and a plurality of cutters carried by the bed for shifting movement relative thereto for cutting and forming the bar stock into a plurality of work pieces while said bar stock is being rotated by the rolls.

4. In a cut-off and forming machine the combination with a bed, of a pair of super-imposed rolls rotatably carried by the bed and forming a work receiving throat therebetween, a slide adapted to shift a section of bar stock into the work receiving throat and hold said bar stock in position therein, means for rotating the rolls at different speeds thereby to exert a force on the work for holding same against the shifting and backing-up slide, and a plurality of cutters adapted to be shifted into engagement with the bar stock for severing said bar stock into a plurality of pin rollers and for simultaneously forming the ends of said rolls.

5. In a cut-off and forming machine the combination with a bed, of a pair of superimposed rolls rotatably carried by the bed and forming a work receiving throat therebetween, a slide adapted to shift a section of bar stock into the work receiving throat and hold said bar stock in position therein, means for rotating the rolls at different speeds thereby to exert a force on the work for holding same against the shifting and backing-up slide, a plurality of cutters adapted to be shifted into engagement with the bar stock for severing said bar stock into a plurality of pin rollers and for simultaneously forming the ends of said rolls, and a movable slide for supporting the cutters during their movement.

6. In a cut-off and forming machine the combination with a bed, of a pair of superimposed rolls rotatably carried by the bed and forming a work receiving throat therebetween, a slide adapted to shift a section of bar stock into the work receiving throat and hold said bar stock in position therein, means for rotating the rolls at different speeds thereby to exert a force on the work for holding same against the shifting and backing-up slide, a plurality of cutters adapted to be shifted into engagement with the bar stock for severing said bar stock into a plurality of pin rollers and for simultaneously forming the ends of said rolls, a movable slide for supporting the cutters during their movement, and power operated means for synchronizing the movement of the bar shifting and backing-up slide with the movement of the cutter slide.

7. In a machine tool organization of the class described, the combination of a bed, a pair of superimposed work rotation and controlling rolls mounted on the bed and forming between them a work receiving throat, means associated with the bed receiving a predetermined length of bar stock from which a plurality of pin rollers are to be cut and formed, a slide carried by the bed adapted to automatically pick up the bar stock and shift same into the work receiving throat between the work controlling and rotating rolls, and cut-off and forming tools for severing the bar stock into a plurality of pin rollers.

8. In a machine tool organization of the class described, the combination of a bed, a pair of superimposed work rotation and controlling rolls mounted on the bed and forming between them a work receiving throat, means associated with the bed receiving a predetermined length of bar stock from which a plurality of pin rollers are to be cut and formed, a slide carried by the bed adapted to automatically pick up the bar stock and shift same into the work receiving throat between the work controlling and rotating rolls, cut-off and forming tools for severing the bar stock into a plurality of pin rollers, a slide supporting the cutters for movement toward the bar stock while it is positioned between the control and rotating rolls, and power operating means for synchronizing the shifting of the work transfer slide and the cutter slide.

9. In a machine tool organization of the class described, the combination of a bed, a pair of superimposed work rotating and controlling rolls mounted on the bed and forming between them a work receiving throat, means associated with the bed receiving a predetermined length of bar stock from which a plurality of pin rollers are to be cut and formed, a slide carried by the bed adapted to automatically pick up the bar stock and shift same into the work receiving throat between the work controlling and rotating rolls, cut-off and forming tools for severing the bar stock into a plurality of pin rollers, a slide supporting the cutters for movement toward the bar stock while it is positioned between the control and rotating rolls, power operating means for synchronizing the shifting of the work transfer slide and the cutter slide, and means for automatically disposing successive lengths of bar stock in position ahead of the work transfer slide.

10. In a cut-off and forming machine the combination of a bed, a pair of superimposed rolls carried by the bed and forming a work receiving throat therebetween, means supporting a supply of bar stock material adjacent the bed from which position it is power fed into operative position relative to the machine, means for severing the bar stock into predetermined lengths, a slide for automatically picking up a length of bar stock for shifting same into the work receiving throat, means for rotating the rolls at different speeds whereby a thrust is exerted on the bar to hold same against the work transfer slide while it is within the grinding throat, and cut-off and forming tools carried by the bed for movement relative thereto toward the bar for severing and forming same into a plurality of work pieces while the bar is held against the end of the transfer slide.

11. In a cut-off and forming machine the combination of a bed, a pair of superimposed rolls carried by the bed and forming a work receiving throat therebetween, means supporting a supply of bar stock material adjacent the bed from which position it is power fed into operative position relative to the machine, means for severing the bar stock into predetermined lengths, a slide for automatically picking up a length of bar stock for shifting same into the work receiving throat, means for rotating the rolls at different speeds whereby a thrust is exerted on the bar to hold same against the work transfer slide while it is within the grinding throat, cut-off and forming tools carried by the bed for movement relative thereto toward the bar for severing and forming same into a plurality of work pieces while the bar is held against the end of the transfer slide, power actuated means for effecting the cut-off of the bar lengths from the supply, and means for actuating the cut-off means synchronously with the movement of the work transfer slide.

12. In a cut-off and forming machine the combination of a bed, a pair of superimposed rolls carried by the bed and forming a work receiving throat therebetween, means supporting a supply of bar stock material adjacent the bed from which position it is power actuated into operative position relative to the machine, means for severing the bar stock into predetermined lengths, a slide for automatically picking up a length of bar stock for shifting same into the work receiving throat, means for rotating the rolls at different speeds whereby a thrust is exerted on the bar to hold same against the work transfer slide while it is within the grinding throat, cut-off and forming tools carried by the bed for movement relative thereto toward the bar for severing and forming same into a plurality of work pieces while the bar is held against the end of the transfer slide, power actuated means for effecting the cut-off of the bar lengths from the supply, means for actuating the cut-off means synchronously with the movement of the work transfer slide, and control means for deenergizing the power feed means for the bar stock after a desired length is in position to be severed from the supply.

13. In a cut-off and forming machine the combination of a bed, a pair of superimposed rolls carried by the bed and forming a work receiving throat therebetween, means supporting a supply of bar stock material adjacent the bed from which position it is power fed into operative position relative to the machine, means for severing the bar stock into predetermined lengths, a slide for automatically picking up a length of bar stock for shifting same into the work receiving throat, means for rotating the rolls at different speeds whereby a thrust is exerted on the bar to hold same against the work transfer slide while it is within the grinding throat, cut-off and forming tools carried by the bed for movement relative thereto toward the bar for severing and forming same into a plurality of work pieces while the bar is held against the end of the transfer slide, power actuated means for effecting the cut-off of the bar lengths from the supply, means for actuating the cut-off means synchronously with the movement of the work transfer slide, control means for deenergizing the power feed means for the bar stock after a desired length is in position to be severed from the supply, and a pair of cams synchronously operated for effecting the operation of the work transfer slide, the shifting of the cutting and forming tools, and the power cut-off means in synchronism.

14. In a machine tool of the class described the combination of a bed, a pair of rollers carried thereby in peripheral opposition and forming between them a work receiving throat, a reel of raw stock carried by the bed, means for cutting the raw stock from the reel into bar lengths, a slide for picking up the bar lengths and disposing same within the work throat, and means for severing the bar length into a plurality of work pieces while within the work throat.

15. In a machine tool of the class described the combination of a bed, a pair of rollers carried thereby in peripheral opposition and forming between them a work receiving throat, a reel of raw stock carried by the bed, means for cutting the raw stock from the reel into bar lengths, a slide for picking up the bar lengths and disposing same within the work throat, means for severing the bar lengths into a plurality of work pieces while within the work throat, and a coupling between the slide and bar stock cut-off means whereby said cut-off means is operated by the slide.

16. In a machine tool of the class described the combination of a bed, a pair of rollers carried thereby in peripheral opposition and forming between them a work receiving throat, a reel of raw stock carried by the bed, means for cutting the raw stock from the reel into bar lengths, a slide for picking up the bar lengths and disposing same within the work throat, means for severing the bar length into a plurality of work pieces while within the work throat, and removable means carried by the bed for receiving the severed work pieces.

17. In a machine tool of the class described the combination of a bed, a pair of rollers carried thereby in peripheral opposition and forming between them a work receiving throat, a reel of raw stock carried by the bed, means for cutting the raw stock from the reel into bar lengths, a slide for picking up the bar lengths and disposing same within the work throat, and means for severing the bar length into a plurality of work pieces while within the work throat, said means comprising cut-off and forming tools adapted to be rotated while effecting the severance of the bar stock.

18. In a machine tool of the class described the combination of a bed, a pair of rollers carried by the bed in peripheral opposition and forming between them a work receiving throat for rotating the work while being operated upon, means for inserting the work within the work receiving throat, means for rotating the rollers at different rates of speed to thereby exert a thrust on the work against the work inserting means, and means for severing the work into individual sections while within the throat and being rotated by the rollers.

19. In a machine tool of the class described for severing a bar of stock into a plurality of individual lengths comprising a supporting bed, a pair of rollers rotatably supported by the bed and forming between the opposed peripheries thereof a work receiving throat, means associated with the bed for supporting a bar of stock to be severed, means associated with the bed for transferring said bar of stock to the work throat formed by the rolls, means for rotating the rolls at different rates of speed for exerting a force thereon against the transfer means, and means for severing the bar into the plurality of individual lengths while within the throat.

20. In a machine tool of the class described for severing a bar of stock into a plurality of individual lengths comprising a supporting bed, a pair of rollers rotatably supported by the bed and forming between the opposed peripheries thereof a work receiving throat, means associated with the bed for supporting a bar of stock to be severed, means associated with the bed for transfering said bar of stock to the work throat formed by the rolls, means for rotating the rolls at different rates of speed for exerting a force thereon against the transfer means, means for severing the bar into the plurality of individual lengths while within the throat, and means associated with the bed for supporting a supply of raw stock from which the bars are obtained.

GEORGE W. BINNS.